P. M. BETZ.
CAR SEAL.
APPLICATION FILED AUG. 23, 1909.
986,129.
Patented Mar. 7, 1911.
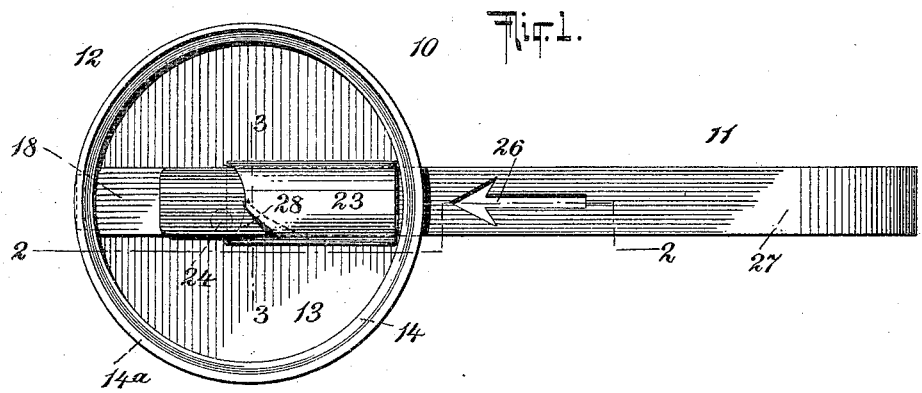
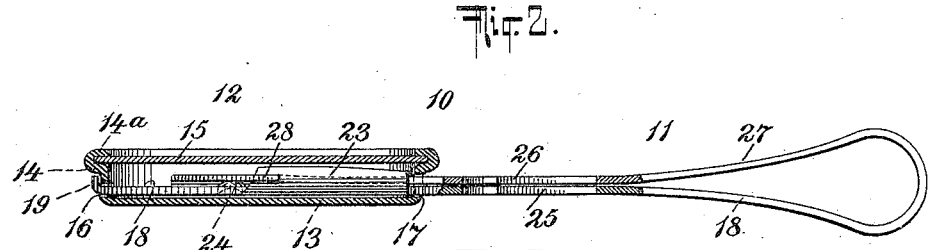
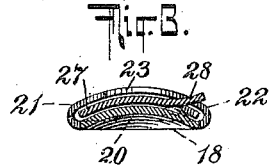
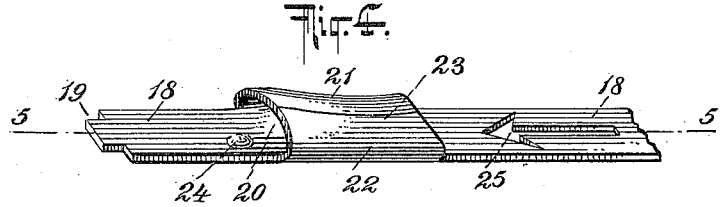
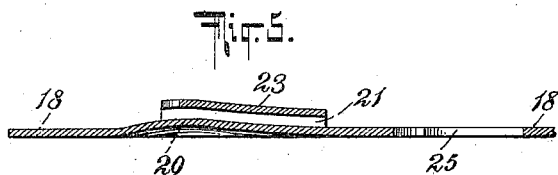
WITNESSES:
INVENTOR
PHILIP M. BETZ
BY
Conrad A. Dieterich
his ATTORNEY

UNITED STATES PATENT OFFICE.

PHILIP M. BETZ, OF YONKERS, NEW YORK.

CAR-SEAL.

986,129. Specification of Letters Patent. Patented Mar. 7, 1911.

Application filed August 23, 1909. Serial No. 514,168.

*To all whom it may concern:*

Be it known that I, PHILIP M. BETZ, a citizen of the United States, residing at Yonkers, Westchester county, in the State of New York, have invented certain new and useful Improvements in Car-Seals, of which the following is a full, clear, and exact specification.

My invention relates to improvements in sealing means or devices comprising essentially a flexible member or shackle adapted to be passed through the staples or other fastening means arranged upon the doors of cars and other closures, and a sealing element adapted to secure the ends of said flexible member or shackle together in such a manner that the latter cannot be removed without destroying said flexible member or said sealing element, and said invention has for its object more particularly to provide a simple, efficient and economical seal which can easily be secured to a fastening device of a car or other closure.

Further, said invention has for its object to provide a seal having a frangible attaching member or shackle which will prevent the parts being tampered with or, when once broken, prevent the parts thereof being again attached to the seal proper.

Further, said invention has for its object to provide a seal which may be readily applied to a lock or fastening device without requiring the use of a seal press or other implement.

Further, said invention has for its object to provide a seal having an attaching member or shackle provided with indicating means whereby a casual observer may readily ascertain whether the seal is intact or whether the same has been tampered with.

To the attainment of the aforesaid objects and ends my invention consists in the novel details of construction, and in the combination, connection and arrangement of parts hereinafter more fully described, and then pointed out in the claims.

In the accompanying drawings forming part of this specification, wherein like numerals of reference indicate like parts, Figure 1 is a top or face view showing one form of seal constructed according to, and embodying my said invention; a portion of said seal proper being removed to expose the interior thereof; Fig. 2, is a section taken essentially on the line 2—2 of Fig. 1; Fig. 3 is an enlarged detail transverse section taken on the line 3—3 of Fig. 1; Fig. 4 is an enlarged detail perspective view showing the construction of one end of the attaching member, and Fig. 5 is a longitudinal section taken on the line 5—5 of Fig. 4.

In said drawings 10 designates the seal as a whole comprising a shackle 11 made of a narrow strip of sheet metal or other suitable flexible material, and a seal proper 12 stamped out of sheet metal or other suitable material. By preference the seal 12 is made in the form of a shallow, circular receptacle 13 having a shoulder 14 along its upper edge, from which extends a rim or flange 14$^a$ adapted to be turned inward and downward upon a cover plate 15.

The receptacle 13 is provided in its opposite sides with slots 16, 17 within which is permanently secured the end 18 of the shackle 11 illustrated at Figs. 4 and 5. The said end 18 is provided at its extremity with a tongue 19 which is adapted to extend through the slot 16 in the receptacle 13, and be turned upwardly against the outer side thereof. The end 18 has the portion adjacent to the tongue 19 curved transversely as illustrated at Fig. 3, and also longitudinally as illustrated at Fig. 5, to form a raised portion 20, and at either side said raised portion 20 are provided longitudinal wing sections 21, 22 which are bent inwardly toward each other and have their longitudinal edges brought together to form a sleeve section 23 which conforms transversely and longitudinally to the raised portion 20 below the same. The outer or entrance portion of said sleeve section 23 is flat and transversely parallel with the portion of the end 18 thereunder, while the inner or exit end of said sleeve section is curved transversely and corresponds with the portion of the end 18 directly thereunder. Further, the inner upper edge of said sleeve section 23 is recessed as shown more clearly at Figs. 1, 4 and 5.

24 denotes a small teat or projection formed at one side of the end 18 adjacent to, and in front of, the exit end of the sleeve section 23, and 25 denotes one indicating member, which may be of any suitable shape or size, and is here shown in the form of an arrow cut out of the portion of said end 18 just outside of the receptacle 13. The said indicating member 25 is adapted to register with a similar indicating device 26 arranged in the other end 27 of the shackle 11 when said end is secured in position within said seal.

The end 27 of the shackle 11 is provided in one of its edges with an inwardly and forwardly extending recess producing a pointed tongue or projection 28 which is adapted to engage the recessed upper edge of the sleeve 23.

In the assembling of the several parts of the seal the attaching member or shackle 11 is secured to the seal 12 by first passing the end 27 from within the receptacle 13 through the slot 17 therein, and then drawing the same therethrough until the outer edge of the sleeve section 23 contacts with the inner edge of the receptacle, whereupon the tongue 19 is then inserted into the slot 16, and bent upwardly. Hereupon the cover plate 15 is secured in place by turning down the rim or flange 14$^a$.

To attach the seal the free end 27 of the shackle 11 is passed through the staple or other member or members of the locking device on the door to be sealed. Hereupon said end 27 is then inserted into the slot 17 in the receptacle 13 and passed into the flat entrance end of the sleeve 23, and as the said end 27 is pushed farther into said sleeve its end becomes curved transversely and conformed to the inner or exit end of said sleeve. As soon as the extremity of said end 27 contacts with the inner edge of the receptacle 13, the end of the pointed tongue or projection 28 will be free of the sleeve 23, and the end 27 is thereupon drawn outwardly again. In drawing the end 27 outward again the end of the pointed tongue or projection 28 will engage the teat 24 on the end 18, force said tongue 28 upwardly and ride over the recessed front edge of the curved end of the sleeve 23, and assume the position illustrated at Figs. 1 and 2. The further withdrawal of said end 27 from the receptacle 13 is thereby prevented and the parts permanently secured together. As soon as the end 27 has been drawn outwardly to its full extent the indicating arrows 25 and 26 in the ends 18 and 27, respectively, will be brought into register.

It will be noted that the cutting out of the indicating arrows 25, 26 serves to materially weaken the ends 18 and 27 of the shackle 11, and thus prevent manipulation of the device without danger of breaking the same, and further that if either of said ends is broken, the cut-out indicating portions cannot be brought into register again, thus indicating at once that the seal has been tampered with.

Having thus described my invention, what I claim and desire to secure by Letters Patent is:

1. A car seal comprising a hollow seal member and a shackle, means for securing said shackle to said seal member, a sleeve arranged upon one end of said shackle constructed to receive and bow the other end of said shackle transversely of its length and hold the same in locking engagement therewith, substantially as specified.

2. A car seal comprising a hollow seal member, and a shackle having one end secured thereto, and its other end free, a sleeve on said secured end arranged within said seal member and constructed to receive the free end of said shackle and bow the same transversely of its length, and means on said free end coöperating with said sleeve for securing the ends of said attaching member together, substantially as specified.

3. A car seal comprising a hollow seal member and a shackle having one end secured thereto, and its other end free, a transversely-curved sleeve arranged upon the end of said shackle disposed within said seal member, adapted to receive the free end of said shackle and bow the same transversely of its length, and an engaging device on said free end adapted to engage with said sleeve for securing the ends of said shackle together and to said seal member, substantially as specified.

4. A car seal comprising a hollow seal member and a shackle having one end secured thereto, a transversely-curved sleeve arranged upon one end of said shackle disposed within said seal member adapted to receive the other end of said shackle and bow the same transversely of its length, an engaging device on the free end of said shackle, adapted to engage with said sleeve, and means for guiding said engaging device into engagement with said sleeve, substantially as specified.

5. A car seal comprising a hollow seal member and a shackle having one end secured thereto, a sleeve on the end of said shackle disposed within said seal member and constructed to bow the free end of said shackle, a tongue on the free end of said shackle adapted to engage one end of said sleeve, and means for guiding said tongue into engagement with said sleeve, substantially as specified.

6. A car seal comprising a hollow seal member and a shackle having one end secured thereto, a raised portion on said secured end within said seal member, a transversely-curved sleeve arranged on said secured end at said raised portion, a tongue provided upon the free end of said shackle adapted to engage the inner end of said transversely-curved sleeve, and means arranged adjacent to the inner end of said sleeve for guiding said tongue into engagement therewith, substantially as specified.

7. A car seal comprising a hollow seal member and shackle having one end secured thereto, a sleeve upon said secured end arranged within said seal member and provided with a flat entrance end and a vertically, transversely curved exit end, a tongue provided upon the free end of said shackle adapted to engage the exit end of said sleeve, and means provided upon the secured end of said shackle for guiding said tongue into engagement with the exit end of said sleeve, substantially as specified.

8. A car seal comprising a hollow seal member, and a flat flexible shackle having one end secured thereto, a sleeve arranged upon said end secured within said seal member and having a flat entrance end, and a curved exit end arranged in a horizontal plane above said entrance end, and an angular tongue arranged upon one side of the free end of said shackle adapted to engage the raised exit end of said sleeve, substantially as specified.

9. A car seal comprising a hollow seal member, and a flat, flexible shackle having one end secured thereto, a sleeve on said secured end arranged within said seal member having a flat entrance end, and a transversely and longitudinally curved exit end, a tongue arranged at one side of said shackle adjacent to the free end thereof adapted to engage the curved exit end of said sleeve, and a projection arranged on the secured end of said shackle adjacent to the exit end thereof for guiding said tongue into engagement with the exit end of said sleeve, substantially as specified.

Signed at the city of New York, in the county and State of New York, this sixteenth day of August, nineteen hundred and nine.

PHILIP M. BETZ.

Witnesses:
  CONRAD A. DIETERICH,
  LLENORE T. HOLLANDER.

---

Copies of this patent may be obtained for five cents each, by addressing the "Commissioner of Patents, Washington, D. C."